United States Patent Office 3,425,963
Patented Feb. 4, 1969

3,425,963
MIXTURES OF BLOWING AGENTS AND FOAMABLE COMPOSITIONS OF MATTER EMPLOYING THE SAME
Thomas Francis, Toronto, Ontario, Maurice H. Jones, Scarborough, Ontario, and Melanie P. Thorne, Toronto, Ontario, Canada, assignors to Ontario Research Foundation, Toronto, Ontario, Canada
No Drawing. Filed Feb. 19, 1964, Ser. No. 345,861
U.S. Cl. 260—2.5    10 Claims
Int. Cl. C08j 1/18; C08g 43/00

This invention relates to mixtures of blowing agents and to foamable compositions of matter employing the same, particularly to foamable compositions of matter containing epoxy-amine reactants and in which all of the components are solid materials. Specifically, this invention relates to all-solid, foamable, epoxy-amine containing compositions of matter which are storage stable for appreciable lengths of time at normal ambient temperatures and which will, upon initiation of the foaming reactions, heat-cure rapidly and give rise to low density, rigid or semi-rigid cellular plastic products.

The production of cellular plastics materials based upon the curing of a polyepoxide by a polyamine and the simultaneous decomposition of a blowing agent is well known in the art and has been previously described (e.g., see United States Patent No. 2,739,134; W. H. Nickerson, Technical Papers, vol. IV, 14th Annual Tech., Conference of S.P.E., Detroit (1958); and L. Bolstad and A. Stenerson, Electronic Design, 5, No. 4 (1957)). However, storage stable mixtures of these components which will give rise to foamed products in the low density range and which are sufficiently exothemic to provide most or all of the heat required for the curing reaction after initiation of the foaming reactions have not heretofore been described to our knowledge.

For the most part, published formulations are based upon liquid components which have limited storage stability, thus precluding their use in applications requiring a foam formulation which can be premixed some time prior to its use. Also, with these liquid systems it is not usually possible to obtain acceptable foamed products in the low density range (2–5 lbs./cu. ft.), because the high reaction exotherm characteristic of these formulations results in extensive charring of the foam interior. It is possible, in some cases, to offset this effect by inclusion of a volatile liquid in the formulation to decrease the overall reaction exotherm by virtue of the latent heat absorbed during vaporization of the liquid.

The preparation of high density products from storage stable, epoxy-amine, foamable formulations based upon all-solid components also has been discussed (see M. R. Pollack and M. K. Zahn, Mater. Design Eng., vol. 54, No. 2, 14 (1961)), but for foaming and curing these mixtures require the application of an external heat source for extended periods of time and do not give rise to products in the low density range. Previous attempts to prepare low density foams from all-solid formulations have resulted in charring of the foamed product, and this effect cannot, as in the aforementioned liquid systems, be offset by the inclusion of a volatile liquid, since this results in loss of the storage properties of the formulations.

In general, in order to obtain an acceptable epoxyamine foamed product, the two major reactions which occur in the foam forming process, i.e., the reaction of the polyepoxide with the amine (polymer formation), and the decomposition of the blowing agent (gas generation), must take place simultaneously and at rates such that substantially complete decomposition of the blowing agent occurs while gradual formation of the polymer causes retention of the generated gas. If, for example, the polymerization reactions occur before completion of the blowing step, the mixture will rigidize before expansion, and high density, irregular products will be obtained. On the other hand, if the gas generating reactions occur before the viscosity of the mixture has sufficiently increased by virtue of the polymer forming reactions, the viscosity characteristics of the expanded, uncured mass will often be such that partial or complete collapse of the cellular structure will take place prior to or during rigidization.

It has been found that foamable powders requiring short curing times and which will give rise to acceptable, rigid, foamed products can be prepared using the tetrafunctional polyepoxide, tetraglycidyloxytetraphenylethane ("Epon 1031" (trademark) Shell Chemical Co.), or certain solid difunctional expoxides (based upon the reaction of bisphenol A with epichlorohydrin) in combination with certain aromatic amines and selected heat labile gas generating compounds such as oxybisbenzenesulphonylhydrazide, diphenylsulphone-3,3'-disulphonylhydrazide, benzene-1,3-disulphonylhydrazide, naphthalene-2,7-disulphonylhydrazide, benzenesulphonylhydrazide, p-toluenesulphonylhydrazide, 1,3-diphenyltriazene (diazoaminobenzene), 1-phenyl-3-p-tolyltriazene, 1,3-di-p-tolyltriazene, t-butylammonium nitrite and nitrourea. Suitable solid amines include, for example, 4,4'-diaminodiphenylsulphone, 4,4'-diaminodiphenylether, m-phenylenediamine, m-tolylenediamine, p-anisidine, 4,4'-diaminodiphenylmethane and 2,6-diaminopyridine.

However, all of these combinations possess one or more undesirable characteristics and none gives rise to foamable compositions of matter possessing all of the following characteristics: storage stability, rapid cure rate, and the facility to yield products in the low density range in the absence of excessive foam charring.

For example, certain foam formulations comprising solid components only and based upon mixtures of an amine, such as diaminodiphenylsulphone, in combination with an epoxide, such as tetrafglycidyloxytetraphenylethane, and a blowing agent, such as an organic sulphonylhydrazide (e.g., oxybisbenzenesulphonylhydrazide) or an azo compound such as azobisformamide or azobisisobutyronitrile, are reasonably storage stable at normal ambient temperatures and, on initiation, yield acceptable foams in the medium density range (6–20 lbs./cu. ft.) that cure rapidly. However, none of these formulations can be used to prepare products in the low-density range without encountering extensive charring of the foam interior. The exothermic heat of reaction in these systems results from the epoxy-amine cross-liking reaction and also, frequently, from the reactions occurring on, or subsequent to, the decomposition of the blowing agent.

It has been found that most of the readily available, solid, gas generating compounds, such as the class known as aromatic sulphonylhydrazides, give rise to exothermic reactions when used in combination with a solid polyepoxide and a solid diamine. Thus, it is not possible to employ sufficient quantities of most of these blowing agents to give low density foamed products without also encountering problems of charring of the foam interior.

On the other hand, nitrourea can be used as a blowing agent in all-solid, epoxy-amine foam systems based upon certain diamines such as 4,4'-diaminodiphenylmethane or m-phenylene diamine in combination with tetraglycidyloxytetraphenylethane to give compositions in powder form which, at elevated temperatures, yield products in the low density range (even down to densities of less than 1.0 lbs./cu. ft.) that cure rapidly and exhibit no internal charring. However, none of the nitroureablown systems possess the property of storage stability, the foaming characteristics of the powdered compositions deteriorating at normal ambient temperatures in a period of a few days.

Accordingly, it is an object of this invention to provide all-solid, foamable compositions of matter which are storage stable and which will cure rapidly to produce cellular products of low density without excessive charring.

It is another object of this invention to provide certain mixtures of blowing agents which can be used to provide cellular products of low density from all-solid, foamable compositions of matter containing the mixtures of blowing agents and which will cure rapidly without excessive charring.

In accordance with this invention it has been discovered, unexpectedly, that certain mixtures of blowing agents can be used to meet the foregoing objects, the mixtures being a blowing agent selected from the class consisting of 1,3-diaryltriazenes and a blowing agent selected from the class consisting of organic sulphonylhydrazides and azobisformamide, mixtures of azobisformamide with any of the sulphonylhydrazides being excluded. Representative sulphonylphydrazides include benzenesulphonylhydrazide, p-toluenesulphonylhydrazide, benzene 1,3-disulphonylhydrazide, naphthalene-2,7-disulphonylhydrazide, oxybisbenzenesulphonylhydrazide and diphenylsulphone-3,3'-disulphonylhydrazide. The disulphonylhydrazide compounds are to be preferred over the monosulphonylhydrazides since the former give better control of the viscosity of the melt during foam rise and, in addition, yield odourless decomposition products. In order to obtain the advantageous properties of the mixtures of blowing agents in epoxy-amine systems, the ratio of the sulphonylhydrazide to the triazene should lie within the range 60:40 to 20:80 by weight. When using azo-compounds such as azobisformamide in combination with a 1,3-diaryltriazene, the ratio of azobisformamide to the triazene should not exceed 20:80 by weight.

A novel and unexpected feature of these mixtures of blowing agents is that in the foam formulations the mixtures will liberate gas at temperatures somewhat lower than those at which the individual blowing agents decompose into gaseous products. This is advantageous, since the lowered foam initiation temperature results in a lowered final foam cure temperature, permitting the use of larger amounts of the blowing agent, and thus the attainment of products of lowered density without extensive charring.

In accordance with this invention, it has been found that an all-solid, foamable composition of matter which is storage stable and which cures rapidly to produce cellular products of low density without excessive charring can be formulated from a multifunctional expoxide, such as tetraglycidyloxytetraphenylethane, ("Epon 1031") an amine having more than one replaceable hydrogen atom attached to a nitrogen atom, such as diaminodiphenylsulphone, and mixtures of the foregoing blowing agents.

Preferred examples of the aforementioned mixtures of blowing agents are those in which a 1,3-diaryltriazene such as 1,3-diphenyltriazene, 1-phenyl-3-p-tolytriazene or 1,3-di-p-tolyltriazene is used in admixture with oxybisbenzenesulphonylhydrazide or diphenylsulphone-3,3'-disulphonylhydrazide. Using such mixtures of blowing agents in combination with the polyepoxide, tetraglycidyloxytetraphenylethane, and the diamine, diaminodiphenylsulphone, it is possible to design formulations which are storage stable at normal ambient temperatures, which will give rise to foamed products with densities as low as 2 lbs./cu. ft. and which exhibit little or no charring of the foam interior.

It should be noted that while one or more of the triazenes may be used with one or more of the sulphonylhydrazides, mixtures employing a sulphonylhydrazide and azobisformamide should be avoided.

It has been found that the aforementioned foamable compositions of matter for use in practising this invention are improved by the inclusion of fillers such as calcium sulphate, talc, cellulose powder, aluminum dust and other inert materials. Addition of these fillers to the formulation serves to lower the core temperature attained during curing by virtue of the specific heat adsorbed, so that a larger percentage of blowing agent may be employed without detrimental side effects such as internal charring. In this way foam densities may be decreased. In addition these fillers act as modifiers to increase the viscosity of the system during foaming. If desirable, certain organic materials such as octyl phenol may be used to decrease the melt viscosity of the formulations and thus assist in even foam rise.

It will be appreciated that all of the components of an all-solid, foamable composition of matter embodying this invention are employed in powdered form.

Several of the formulations embodying this invention have been stored at 70° F. for several months without detriment to the foaming characteristics of the powders or the properties of the foamed products. Many of the foamed products obtained from these epoxy-amine formulations have a closed cell content of 75–95% and compressive strengths of 25–30 p.s.i. at densities of 3.0–3.5 lbs./cu. ft. Potential uses of the foamable compositions of matter of the present invention are many and diverse, and include their use in the self-expandable sheet described in copending application Ser. No. 330,020 filed Dec. 12, 1963, for "Flexible, Self-Expandable and Self-contained Unit," by Thomas Francis, J. Furrer, M. H. Jones, G. Murray and M. P. Thorne.

The following examples will serve to illustrate the process used to prepare low density cellular plastic materials from all-solid, epoxy-amine formulations embodying this invention. These examples are meant to illustrate rather than to confine the scope of the present invention.

Example I

A quantity of 25 g. tetraglycidyloxytetraphenylethane (−60 mesh) was milled with 6.2 g. diaminodiphenylsulphone, 1.7 g. of oxybisbenzenesulphonylhydrazide, 1.7 g. diazoaminobenzene and 0.5 g. of a non-ionic surfactant, such as "Pluronic F–68" (trademark, Wyandotte Chemical Co.). "Pluronic F–68" is a block copolymer comprising approximately 80% by weight of polyoxyethylene groups and 20% by weight polyoxypropylene groups and having a melting point of 50° C. Its use is known in the art, and it is employed to promote uniform cell size in the foamed product. The powdered formulation was heated in an oven maintained at 150° C. Foaming was initiated when the temperature of the composition reached 110° C., and was complete within 5 minutes. The density of the foamed product was 4.0 lbs./cu. ft.

Example II

A quantity of 100 g. tetraglycidyloxytetraphenylethane (−60 mesh) was milled with 25 g. of diaminodiphenylsulphone, 10 g. of oxybisbenzenesulphonylhydrazide, 10 g. of diazoaminobenzene, 40 g. of aluminum powder and 2 g. of "Pluronic F–68." This composition (30 g.) was heated in an oven maintained at 150° C. and gave a foamed product having a density of 3.0 lbs./cu. ft.

Example III

A quantity of 25 g. tetraglycidyloxytetraphenylethane (−60 mesh) was milled with 6.2 g. diaminodiphenylsulphone, 3 g. oxybisbenzenesulphonylhydrazide, 1.5 g. diazoaminobenzene, 8 g. aluminum powder, 2 g. octyl phenol and 0.5 g. of "Pluronic F–68." This composition, when heated in an oven maintained at a temperature of 150° C., started to foam at 110° C. The product density was 3.5 lbs./cu. ft.

Example IV

A quantity of tetraglycidyloxytetraphenylethane (25 g.) was mixed with 6.2 g. diaminodiphenylsulphone, 2.5 g.

diphenylsulphone - 3,3' disulphonylhydrazide, 1.5 g. diazoaminobenzene and 0.5 g. of a non-ionic surfactant. The power thus obtained was heated in an oven at 165° C. and gave rise to a rigid foamed product having a density of 3 lbs./cu. ft. The cure time was eight minutes.

Example V

A quantity of tetraglycidyloxytetraphenylethane (25 g.) was mixed with 6.2 g. diaminodiphenylsulphone, 0.35 g. azobisformamide, 1.4 g. diazoaminobenzene and 0.5 g. of a non-ionic surfactant. The powder thus obtained was heated in an oven maintained at 170° C. Foaming was initiated when the temperature of the composition had reached 160° C. and the rigid foamed product produced set in five minutes. The product density was 4.8 lbs./cu. ft.

Example VI

A quantity of 25 g. tetraglycidyloxytetraphenylethane was milled with 6.2 g. of diaminodiphenylsulphone, 1.7 g. oxybisbenzenesulphonylhydrazide, 1.5 g. diazoaminobenzene, 3 g. of the talc powder and 0.5 g. of a non-ionic surfactant. The powder thus obtained was heated in an oven maintained at 180° C. and gave rise to a rigid cellular product having a density of 4.2 lbs./cu. ft., foaming being initiated at 110°–120° C.

Example VII

A quantity of 100 g. tetraglycidyloxytetraphenylethane (—60 mesh) was milled with 25 g. diaminodiphenylsulphone, 8 g. oxybisbenzenesulphonylhydrazide, 8 g. 1-phenyl-3-p-tolyltriazene and 2 g. of a non-ionic surfactant. 30 gm. of the resultant finely divided, free flowing, powder when heated in an oven at 180° C. cured rapidly with a foam initiation temperature of 110° C. The foamed product had a fine cell structure and a density of 2.7 lbs./cu. ft.

Example VIII

A quantity of 100 g. of tetraglycidyloxytetraphenylethane (—60 mesh) was milled with 25 g. of diaminodiphenylsulphone, 5 g. oxybisbenzenesulphonylhydrazide, 12 g. 1-phenyl-3-p-tolyltriazene and 2 g. of a non-ionic surfactant. 30 gm. of the powdered composition was heated in an oven at 180° C. Foaming was initiated at 110° C. and the composition cured rapidly to produce a fine-celled, rigid foam of a density of 2.7 lbs./cu. ft.

Example IX

A quantity of 100 g. of tetraglycidyloxytetraphenylethane (—60 mesh) was milled with 25 g. diaminodiphenylsulphone, 7 g. diphenylsulphone-3,3'-disulphonylhydrazide, 7 g. 1-phenyl-3-p-tolyltriazene and 2 g. of a non-ionic surfactant. When 30 gm. of this powder was heated in an oven at 180° C., this mixture had a foam initiation temperature of 110 C. and gave rise to a rigid foam of a density of 3.1 lbs./cu. ft.

Example X

A quantity of 100 g. of tetraglycidyloxytetraphenylethane (—60 mesh) was milled with 25 g. of diaminodiphenylsulphone 7 g. oxybisbenzenesulphonylhydrazide, 7 g. 1,3-di-p-tolyltriazene and 2 gm. of a non-ionic surfactant. 30 gm. of this material, when heated in an oven at 180° C., gave a rigid foam of good cell structure with an initiation temperature of 110° C.

The following table illustrates the degree of storage stability of the foamable compositions of matter set out in the preceding examples. With respect to the foamable compositions of matter in Examples 7–9 inclusive, it should be noted that storage stability tests were conducted only for the time period noted in the following table, and the composition showed no evidence of deterioration within this period.

Storage stabilities of epoxy foam formulations

| Formulations as in Example: | Storage period at 70° F., months |
|---|---|
| I | >15 |
| II | >15 |
| III | 3 |
| IV | >6 |
| VI | >15 |
| VII | >2 |
| VIII | >2 |
| IX | >2 |

While preferred embodiments of this invention have been set out in detail herein, those skilled in the art will appreciate that changes and modifications may be made therein without departing from the spirit and scope of this invention as defined in the appended claims.

What we claim as our invention is:

1. In an all-solid foamable composition of matter containing a solid multifunctional epoxide and a solid amine containing more than one replaceable hydrogen atom attached to a nitrogen atom, a mixture of solid blowing agents comprising at least one solid blowing agent selected from the class consisting of 1,3-diaryltriazenes and at least one solid blowing agent selected from the class consisting of organic sulphonylhydrazides and azobisformamide, mixtures of azobisformamide with any of said sulphonylhydrazides being excluded, the ratio by weight of said sulphonylhydrazide to said triazene being between 60:40 and 20:80, and the ratio by weight of said azobisformamide to said triazene being less than about 20:80.

2. In an all-solid foamable composition of matter containing solid tetraglycidyloxytetraphenylethane and solid 4,4'-diaminodiphenylsulphone, a mixture of solid blowing agents comprising at least one solid blowing agent selected from the class consisting of 1,3-diaryltriazenes and at least one solid blowing agent selected from the class consisting of organic sulphonylhydrazides and azobisformamide, mixtures of azobisformamide with any of said sulphonylhydrazides being excluded, the ratio by weight of said sulphonylhydrazide to said triazene being between 60:40 and 20:80, and the ratio by weight of said azobisformamide to said triazene being less than about 20:80.

3. In an all-solid foamable composition of matter containing a solid multifunctional epoxide and a solid amine containing more than one replaceable hydrogen atom attached to a nitrogen atom, a mixture of solid blowing agents comprising at least one solid blowing agent selected from the class consisting of 1,3-diphenyltriazene, 1-phenyl-3-p-tolyltriazene and 1,3-di-p-tolyltriazene and at least one solid blowing agent selected from the class consisting of benzenesulphonylhydrazide, p-toluenesulphonylhydrazide, benzene 1,3-disulphonylhydrazide, naphthalene-2,7-disulphonylhydrazide, oxybisbenzenesulphonylhydrazide, diphenylsulphone-3,3'-disulphonylhydrazide and azobisformamide, mixtures of azobisformamide with any of said sulphonylhydrazides being excluded, the ratio by weight of said sulphonylhydrazide to said triazene being between 60:40 and 20:80, and the ratio by weight of said azobisformamide to said triazene being less than about 20:80.

4. In an all solid foamable composition of matter containing solid tetraglycidyloxytetraphenylethane and solid 4,4'-diaminodiphenylsulphone, a mixture of solid blowing agents comprising at least one solid blowing agent selected from the class consisting of 1,3-diphenyltriazene, 1-phenyl-3-p-tolyltriazene and 1,3-di-p-tolyltriazene and at least one solid blowing agent selected from the class consisting of benzenesulphonylhydrazide, p-toluenesulphonylhydrazide, benzene 1,3-disulphonylhydrazide, naphthalene-2,7-disulphonylhydrazide, oxybisbenzenesulphonylhydrazide, diphenylsulphone-3,3'-disulphonylhydrazide and azobisformamide, mixtures of azobisformamide and any of said sulphonylhydrazides being excluded, the ratio by weight of said sulphonylhydrazide to said triazene being between 60:40 and 20:80, and the ratio by weight of said azobisformamide to said triazene being less than about 20:80.

5. In an all solid foamable composition of matter containing solid tetraglycidyloxytetraphenylethane and solid 4,4'-diaminodiphenylsulphone, a mixture of solid blowing agents comprising at least one solid blowing agent selected from the class consisting of 1,3-diphenyltriazene, 1-phenyl-3-p-tolyltriazene and 1,3-di-p-tolyltriazene and at least one solid blowing agent selected from the class consisting of oxybisbenzenesulphonylhydrazide and diphenylsulphone-3,3'-disulphonylhydrazide, the ratio by weight of said sulphonylhydrazide to said triazene being between 60:40 and 20:80.

6. The invention according to claim 5 including a filler selected from the class consisting of calcium sulphate, talc, cellulose powder and aluminum dust.

7. The invention according to claim 6 including solid octyl phenol.

8. A mixture of blowing agents comprising at least one solid blowing agent selected from the class consisting of 1,3-diaryltriazenes and at least one solid blowing agent selected from the class consisting of organic sulphonylhydrazides and azobisformamide, mixtures of azobisformamide with any of said sulphonylhydrazides being excluded, the ratio by weight of said sulphonylhydrazide to said triazene being between 60:40 and 20:80, and the ratio by weight of said azobisformamide to said triazene being less than about 20:80.

9. A mixture of blowing agents comprising at least one solid blowing agent selected from the class consisting of 1,3-diphenyltriazene, 1-phenyl-3-p-tolyltriazene and 1,3-di-p-tolyltriazene and at least one solid blowing agent selected from the class consisting of benzenesulphonylhydrazide, p-toluenesulphonylhydrazide, benzene 1,3-disulphonylhydrazide, naphthalene-2,7 - disulphonylhydrazide, oxybisbenzenesulphonylhydrazide, diphenylsulphone-3,3'-disulphonylhydrazide and azobisformamide, mixtures of azobisformamide and any of said sulphonylhydrazides being excluded, the ratio by weight of said sulphonylhydrazide to said triazene being between 60:40 and 20:80, and the ratio by weight of said azobisformamide to said triazene being less than about 20:80.

10. A mixture of blowing agents comprising at least one solid blowing agent selected from the class consisting of 1,3-diphenyltriazene, 1-phenyl-3-p-tolyltriazene and 1,3-di-p-tolyltriazene and at least one solid blowing agent selected from the class consisting of oxybisbenzenesulphonylhydrazide and diphenylsulphone-3,3'-disulphonylhydrazide, the ratio by weight of said sulphonylhydrazide to said triazene being between 60:40 and 20:80.

References Cited

UNITED STATES PATENTS 2,831,820    4/1958    Case et al. _____ 260—2.5

FOREIGN PATENTS 714,474    4/1958    Great Britain.

MURRAY TILLMAN, *Primary Examiner.*

MORTON FOELAK, *Assistant Examiner.*

U.S. Cl. X.R.

260—9, 37, 830